Feb. 14, 1956　　　W. T. BROWN　　　2,734,433
TROWEL DEVICE
Filed Dec. 1, 1952　　　　　　2 Sheets-Sheet 1
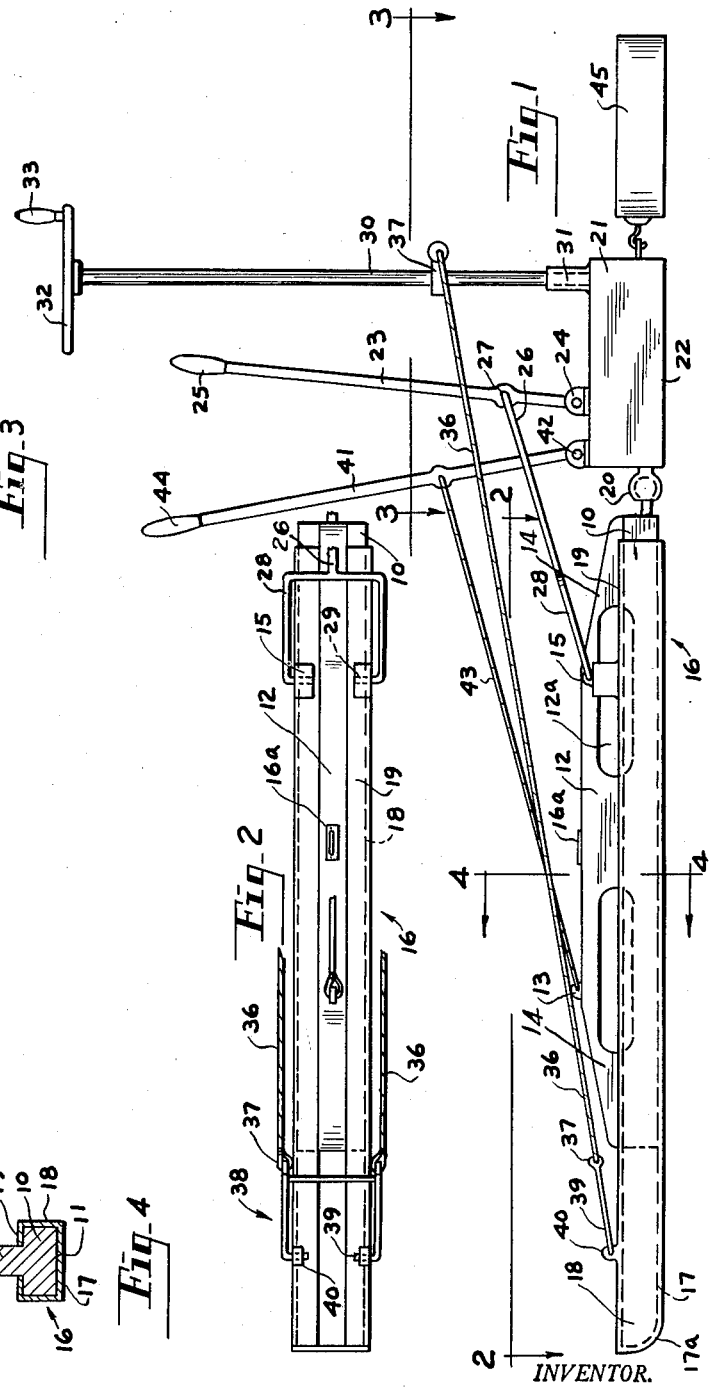
INVENTOR.
WILLIAM T. BROWN.
BY
Louis Chayka
ATTORNEY Feb. 14, 1956  W. T. BROWN  2,734,433
TROWEL DEVICE Filed Dec. 1, 1952  2 Sheets-Sheet 2

INVENTOR.
WILLIAM T. BROWN.

BY Louis Chayka

ATTORNEY.

United States Patent Office 2,734,433
Patented Feb. 14, 1956

2,734,433
TROWEL DEVICE

William T. Brown, Detroit, Mich.

Application December 1, 1952, Serial No. 323,398

2 Claims. (Cl. 94—45)

The object of my improvement is to provide a device capable of imparting to the surface of a pavement in the final stages of its construction a smooth finish. The task, when carried out manually, is a tedious one, as the work is best done while the worker is in a kneeling position. The use of my device eliminates the necessity of this most uncomfortable and tiring posture and makes it possible to perform the work much easier and quicker. This is particularly true when my device is combined with power means and manual controls for the best operation of said device.

Specifically, the mechanized device of my invention contemplates the use of a suitable vehicle affording a space for the operator and including a mechanism for the operation of a trowel which is disposed forwardly of said vehicle.

I shall now describe my device with reference to the accompanying drawings in which:

Fig. 1 is a side elevational view of my device, including a stand for the operator and control means on a platform adjoining said stand;

Fig. 2 is a top elevational view of my device with some elements shown in a fragmentary view;

Fig. 3 is a top elevational view of the control unit of my device;

Fig. 4 is a sectional view on line 4—4 of Fig. 1;

Similar numerals refer to similar parts throughout the several views.

Figure 5:
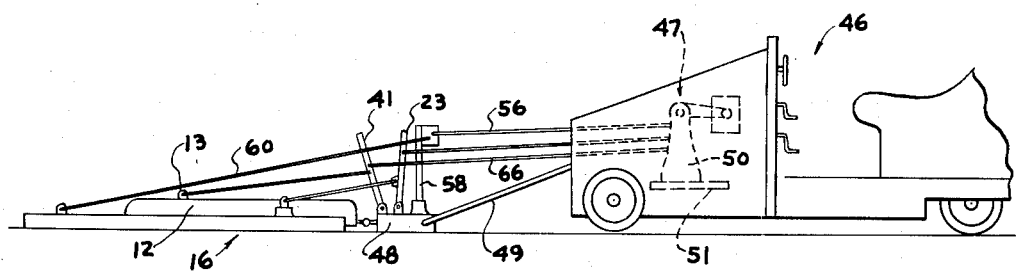
Fig. 5 is a side elevational view of my device combined with power means mounted within a vehicle.
Figure 6:
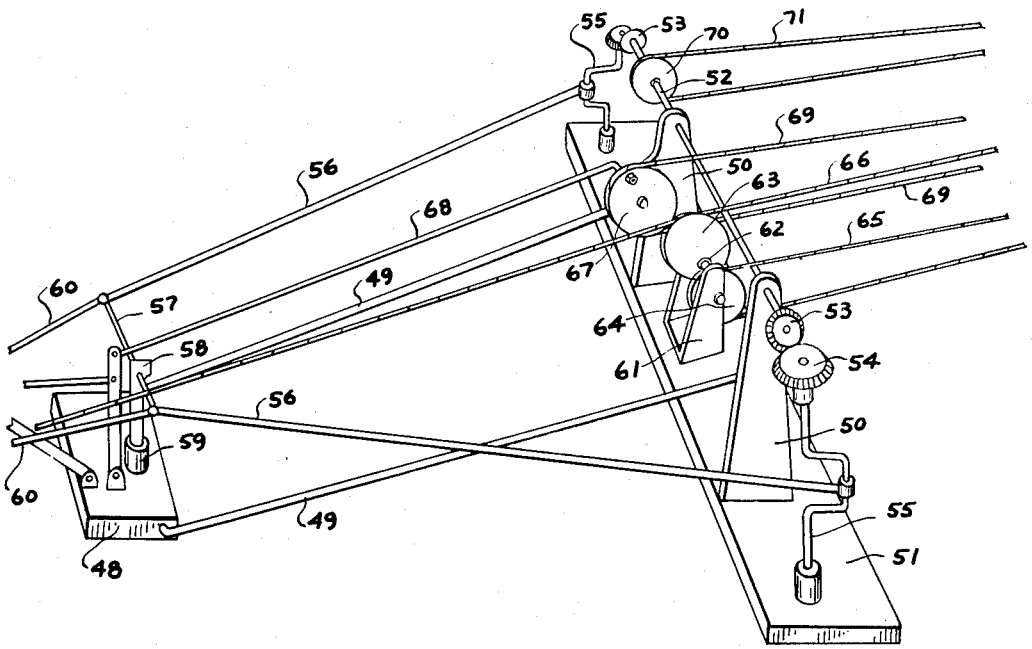
Fig. 6 is a perspective view of a mechanism driven by power means and adapted to operate my said device.

First, I shall describe the type of my device which may be wholly operated manually. The device includes an oblong, horizontally-disposed core 10 having a flat bottom 11 of a uniform width throughout its length, the core being provided at the top with a narrow, vertical rib 12 extending in the direction of the core. In cross-section the core has the shape of an inverted letter T, the base of the core extending to both sides from said rib 12. An eyelet 13 at the front end of the rib serves as a means for attachment of control means to which reference will be made in the body of the specification.

In order to decrease the weight of the core, the rib is formed with open spaces 12a, the end portions of the rib being tapered at 14 as shown in the drawing. Mounted upon said core in a telescopic relation thereto is a trowel 16 which is best made of sheet metal in the form of an oblong casing. The casing has a smooth bottom plate 17 and two upright side walls 18, each wall having an inwardly-turned flange 19, the bottom plate, the sides, and the flanges being in a sliding contact with the outer surface of the core. It will be noted that flanges 19 straddle said rib portion 12 of the core 10 and that the front of plate 17 curves upwardly, as shown at 17a. Mounted on each flange 19 is an ear 15 for convenient attachment of control means, to which reference will be had presently. A spirit level 16a on top of the rib 12, midway its length, serves as a conventional means for checking the level position of the trowel.

One end of the core, which I shall call the rear end, is connected to a platform 21, affording enough space for location thereon of control means for the operation of the trowel. The connection ought to be of a kind permitting a relative angular movement between said trowel and the platform. The drawings show a ball and socket joint 20 which would well serve the purpose. The platform has a flat base 22 for a frictional contact with the surface of the pavement on which it rests.

The control means include a lever 23 pivotally held at its lower end within a bracket 24 and provided at the top with a handle 25 for manual operation thereof. A rigid rod or rail 26 pivotally affixed to said lever at 27 is provided at the other end with a two-prong fork 28, the ends 29 of which are turned at right angle to rib 12 and fit into the above-said ears 15 which are mounted upon flanges 19.

Mounted on the platform at the end remote from the trowel is a vertical shaft 30 mounted for rotation about its axis within a bearing 31 which is secured to the top of said platform. A wheel 32 on top of said shaft serves as a means of operating the shaft, the wheel being provided with a handle 33 for its easier manipulation.

A U-shaped clamp 34 secured to the shaft at a level above the sockets 31 supports two cylindrical arms 35, the arms projecting outwardly in opposite directions. Secured to the ends of the arms are two cables 36, one cable extending from one arm, the other from another arm, each cable being connected at its opposite end to one side of a rigid bracket, as shown at 37. The bracket, generally identified by numeral 38, includes two hooks 39 for engagement with eyelets 40 mounted on flanges 19 of trowel 16 in the front end thereof.

Located at the front end of the platform 22 is another lever 41 pivotally mounted at its lower end, as shown at 42. A cable 43 connects the lever with an eyelet 13 upon the top of rib 12 of said core 10. A handle at the top of the last-named lever is marked 44.

Removably attached to the rear end of the platform by hooks is a stand 45, the stand being large enough to accommodate the operator of the trowel in a standing position.

The following is the manner in which my device is to be used:

The trowel is placed over the pavement while said pavement is in a plastic stage, the platform 22 being disposed rearwardly of said trowel, while the stand 45 is attached to the platform as shown. The operator, having mounted the stand, may seize lever 23 and rock it back and forth from its pivotal connection at 24. As the lever is attached by means of a rigid rod 26 to the trowel at 15, the movement of the lever will impart a back and forth sliding motion to said trowel, smoothing the surface of the plastic material under plate 17 of said trowel. Upon having imparted a smooth finish to the area so treated, the whole device, including the trowel, the platform, and the stand, may be pushed rearwardly until the trowel rests upon a surface needing to be treated.

If it is required that the trowel in the process of smoothing the surface be moved from one side to another in a reciprocating movement, this may be done by means of said shaft 30. When the shaft is turned in one direction by means of wheel 32 one of the cables 36 will swerve the trowel to one side. When the wheel is turned in the opposite direction the trowel will be swerved to the other side.

When an area of the surface treated in the above manner has been satisfactorily finished, the trowel may be swung upwardly together with the core 10 from its ball and socket connection 20. This may be done by pulling lever 41 rearwardly, the lever being connected to eye 13 at the top of rib 12 of the core. While the trowel is in this raised position the whole device may be shifted rearwardly to a new area. It is also by means of lever 41 that the trowel may be raised and released, to come down upon the pavement for tamping and patting the plastic material of said pavement.

In Fig. 5 I am disclosing my power-operated device including a vehicle 46 in which a power driven mechanism is shown in dotted lines and is generally identified by numeral 47. The combination shown in Fig. 5 includes a platform analogous to platform 22 in Fig. 1 and a trowel 16 identical in structure with that shown in my manually-operated device.

The platform, which is disposed forwardly of the truck, is kept in a spaced relation thereto by means of a pair of braces 49. The braces extend from the sides of the platform, two upward standards 50 rising from a baseboard 51 within said vehicle. Journalled within the upper ends of the standards is a horizontal shaft 52 which supports at each end a bevelled gear 53. Each gear is in mesh with a gear wheel 54 mounted upon a vertical crankshaft 55. Two crank rods 56 connect the crank with a horizontal bar 57, the latter being mounted midway its length upon a vertical post 58. At its lower end the post fits into a cylindrical socket 59 and is adapted to be rotated therein about its axis.

Cables 60 extending from the ends of bar 57 serve the same purpose as cables 36; that is, they are used for the purpose of imparting a reciprocating movement of the trowel from one side to another.

Mounted on baseboard 51 is a U-shaped member supporting a short, horizontal shaft 62. A cam pulley 63 axially keyed to the shaft is adapted to be rotated by means of a pulley 64 mounted upon one end of said shaft. A belt 65 connected to a source of power drives said shaft. The cam pulley is adapted to act upon a cable 66 which is anchored at one end within the vehicle, while the other end of the cable is secured to lever 41, as shown in Fig. 5. As the cam rotates, said cable 66 will be successively raised and lowered, causing said cable to exert a pull on said lever. This, in turn, will lift and drop the trowel, both these functions, that is, lifting and dropping, taking place during each complete revolution of the cam. As stated above, this action of the trowel serves to tamp the plastic material of the pavement.

The mechanism to actuate the trowel proper, including plate 17 which is to be moved reciprocally back and forth with respect to core 12, includes a wheel 67 which is mounted for rotation on one of the vertical standards 50. A rod 68 pivotally connected at one end to said wheel 67 in an eccentric relation thereto is affixed at the other end to lever 23. The latter, as already described, is connected to the trowel proper by means of rod 26. Wheel 67 is driven by means of a belt 68 from a source of power within the truck. It is from this source, also, that shaft 52 is driven by means of a pulley 70 keyed to said shaft and by means of a belt 71.

The source of power is not shown nor described, as it is no part of the invention and as engines supplying power are well known. It will be understood that a plurality of clutches or similar devices have to be used for the selective operation of the levers mounted on platform 48. This, however, is also a matter well known in trade and, therefore, needs no description.

It will be understood that the elements for the operation of my trowel by power means may be substituted by other equivalents and that some changes may be made in the structure of my trowel without departing from the inventive principle disclosed herein.

What I, therefore, wish to claim is as follows:

1. A device serving to impart a smooth finish to a pavement while in a plastic condition, the device comprising a trowel composed of a solid oblong core and a sheet metal casing fitting over the core in a sliding telescopic engagement therewith, the casing including a flat bottom plate adapted for operative contact with the surface of the pavement, a platform disposed rearwardly of the core, the platform adapted to rest on the pavement and being connected by a swivel joint to the rear end of the core, means to impart to the casing a reciprocal back and forth movement, the means including a lever on said platform, and rod means extending from the lever to said casing and connected thereto, means to cause the trowel to swing sideways, the means including a vertical shaft mounted on the platform and adapted to be rotated about its axis, and two horizontal arms extending laterally from the shaft in opposite directions, and cable means connecting the respective arms with the respective sides of the casing, the arms being adapted to be swung back and forth in an arc by means of said shaft, means to swing the trowel upwardly from the swivel joint, the means including a lever on the platform and a cable extending therefrom and connected to the front end of the core, a vehicle rearwardly of the platform, rigid brace means to keep the platform and the vehicle in a fixed, spaced relation to each other, and power means within said vehicle for the operation of said levers and said vertical shaft.

2. A trowel to impart a smooth finish to a pavement while in a plastic condition, the trowel comprising an oblong solid core and a sheet metal casing in a telescopic relation therewith, the casing including a flat bottom plate adapted to rest on the pavement, a platform back of the trowel, swivel means connecting the platform to the rear end of the core, a plurality of lever means mounted on the platform and connected to the casing to impart thereto selectively a back and forth movement forwardly or laterally, lever means mounted on the platform and connected to the front end of the core to swing up the trowel from the swivel joint to a position above the pavement, a vehicle disposed rearwardly of the platform, rigid brace means connecting said platform to the vehicle in a fixed spaced relation to each other, power means in said vehicle to operate said levers and manually operated means to control said power means.

References Cited in the file of this patent

UNITED STATES PATENTS

| | | |
|---|---|---|
| 943,727 | Albers et al. | Dec. 21, 1909 |
| 1,306,353 | Reynolds | June 10, 1919 |
| 1,717,138 | Beuka | June 11, 1929 |
| 2,084,068 | Vinton | June 15, 1937 |
| 2,249,264 | Baily | July 15, 1941 |